May 3, 1955 A. J. TORRE 2,707,730

AMPLIFIER CIRCUITS FOR TELEVISION PICTURE SIGNAL CHANNELS

Filed May 21, 1951 2 Sheets-Sheet 1

INVENTOR
Alton J. Torre
BY
ATTORNEY

INVENTOR
Alton J. Torre
BY
ATTORNEY

United States Patent Office 2,707,730

Patented May 3, 1955

2,707,730

AMPLIFIER CIRCUITS FOR TELEVISION PICTURE SIGNAL CHANNELS

Alton J. Torre, Westmont, N. J., assignor to Radio Corporation of America, a corporation of Delaware Application May 21, 1951, Serial No. 227,481

1 Claim. (Cl. 179—171)

This invention relates to wide-band amplifier circuits and more particularly to intermediate-frequency amplifiers such as those employed in television receivers, wherein it is desired to pass picture signals covering a wide band of frequencies, and to reject sound signals, or the like covering a narrow band of frequencies, adjacent to the wide frequency band.

In television systems it is the preferred practice to transmit the picture signals on one carrier wave and to transmit the complemental sound signals on an adjacent carrier wave. The two carrier waves are as closely spaced as possible to permit the television channel bandwidth to remain as small as possible.

In order to prevent the sound signals from entering the picture signal channel, it has been the practice to employ some kind of rejector circuit associated with the picture channel. In accordance with the present invention it is desired to provide a rejection circuit which will in addition function to determine the intermediate-frequency amplifier selectivity characteristic.

Selectivity is important as a design limitation in providing intermediate frequency amplifiers for video signals, because interference is readily detected in reproduced pictures. Conversely a broad bandpass is required for reproducing the picture information with good fidelity. Because of these conflicting requirements it has in general been necessary to provide compromise operation in intermediate frequency amplifier circuits, or other wide band amplifier circuits.

It is accordingly a primary object of the invention to provide an improved highly selective wide band amplifier circuit, which is well adapted for use as a video intermediate frequency amplifier.

Ordinary improvements in selectivity usually require complex circuits. In such circuits it is difficult to obtain uniform bandpass and selectivity in each circuit produced and to maintain uniformity in mass production. In commercial production of television receivers, circuits must be provided which will uniformly provide and maintain satisfactory operation. Therefore a simplified circuit is desired in accordance with this invention which will afford the desired selectivity and bandpass characteristics.

It is further important in commercial television circuits to prevent tuning interaction between stages. It is difficult and expensive in a commercial assembly line to properly align a television set for optimum operation if the alignment procedure causes tuning interaction. A circuit affording a single alignment without retouching is therefore desirable from the production standpoint, and will in addition provide more stable operation throughout a plurality of operating conditions.

Therefore another object of the invention is to provide a broad band amplifier circuit which may be easily aligned, for proper response characteristics.

Intermediate frequency amplifiers are desired for operation in the vicinity of 40 megacycles. At this frequency, however, it is difficult to attain the high "Q" circuits necessary for providing high selectivity required for a 4 megacycle television pass-band. Accordingly there are further provided in accordance with the invention highly selective television intermediate frequency amplifier circuits for high frequency operation which do not have exacting requirements generally necessary for providing high "Q" operation.

There is therefore provided in accordance with the present invention a wide-band amplifier circuit particularly useful in high-frequency picture intermediate-frequency amplifier systems. A simplified interstage coupling circuit is provided for effecting both the requisite bandpass and selectivity characteristic, comprising an m-derived T-section filter having double rejector legs. Each of the rejector legs is tuned to series resonance at one of the pair of frequencies closely adjacent to either side of the desired passband of the filter. For television video operation these rejector legs may be tuned respectively to the adjacent channel sound carrier and the complemental sound carrier to provide adequate sound rejection in addition to the required bandpass characteristics.

It is therefore a general object of the invention to provide simplified wide band amplifiers having improved selectivity and high gain.

It is a further object of the invention to provide improved intermediate-frequency amplifier circuits which highly attenuate signals lying outside of but close to the amplifier passband.

It is a further object of the invention to provide an improved picture intermediate-frequency amplifier for a combined picture and sound receiver which has a wide passband for picture signals and which has a sharp cutoff characteristic on either side of the passband.

It is a still further object of the invention to provide an improved intermediate frequency amplifier for a combined picture and sound receiver which highly attenuates the sound signal yet which provides a high amplitude sound voltage for audio channel operation.

Further objects and advantages of the invention will be found throughout the following detailed description of the invention. For a clear understanding of the invention it should be considered in connection with the accompanying drawings, in which like circuit elements are designated by the same reference characters throughout the respective figures of which:

Figures 1, 2:
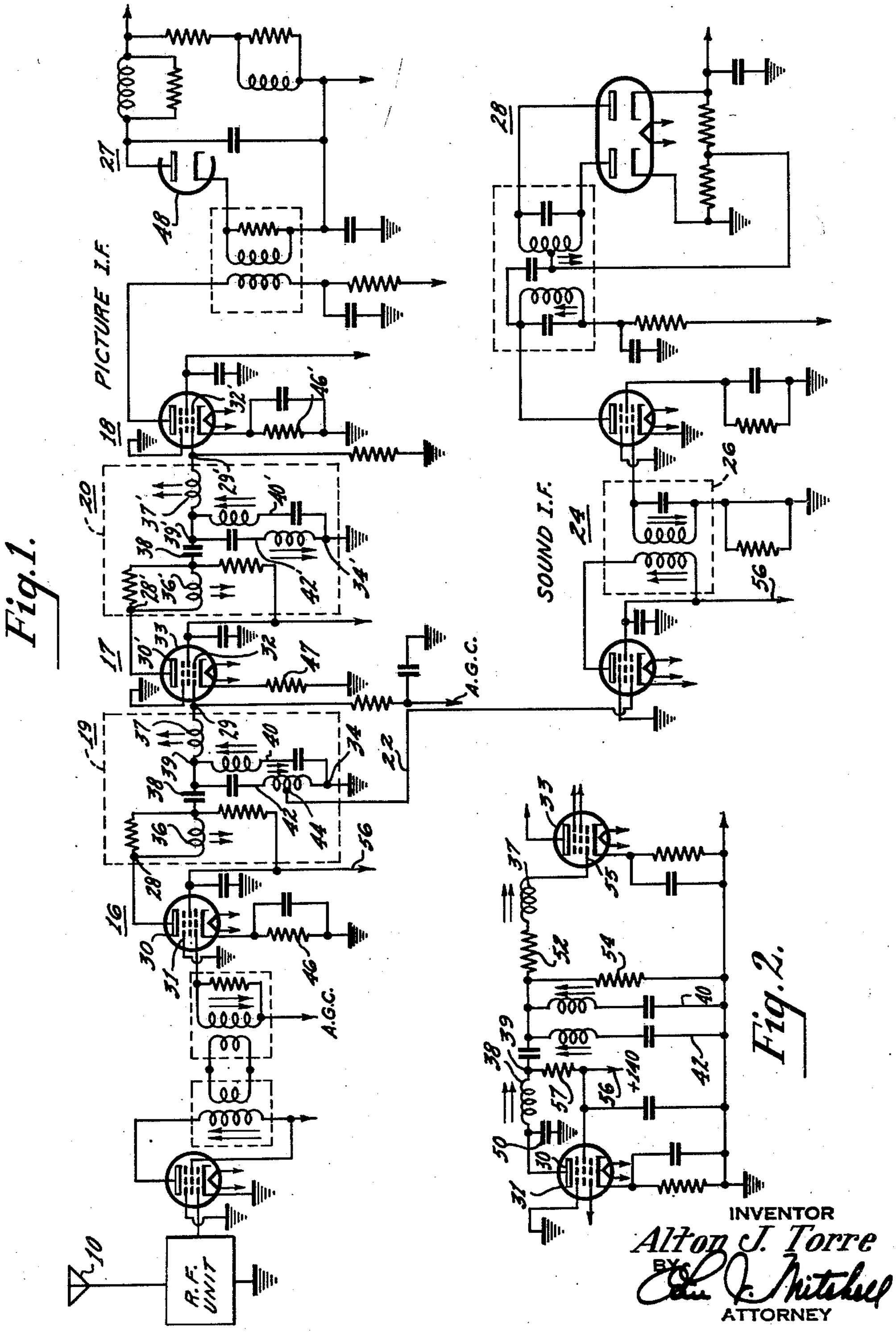
Figure 1 is a schematic circuit diagram of a television receiver embodying one form of the invention.
Figures 2 to 5 are schematic diagrams of interstage coupling networks provided in accordance with the invention; and, Figure 6 is a graphical representation of a curve showing the frequency response characteristics of amplifiers constructed in accordance with the invention.

In the circuit diagram of Figure 1 a receiving antenna 10 is coupled by means of a radio-frequency (R.-F.) unit 12 to a converter stage 14, which is link coupled to the first intermediate-frequency (I.-F.) amplifier stage 16. Additional picture intermediate-frequency amplifier stages 17 and 18 are provided, with interstage coupling circuits 19 and 20. From the first interstage coupling circuit 19 a lead 22 is provided for transferring input signals to a sound intermediate frequency channel 24 having a conventional transformer coupling circuit 26. The video detector circuit 27 and the audio detector circuit 28 are coupled respectively to the corresponding intermediate frequency channels for conventional operation.

The interstage coupling circuits 19 and 20 each comprise a three terminal m-derived T-section filter, modified from that shown in the British Patent 410,499 accepted May 8, 1934, to provide a broad band response in the order of 4 megacycles and rejection of adjacent television signal frequencies outside of but close to the passband on either side. The high signal potential terminals 28 and 29 of the filter are connected respectively to the anode output terminal 30 and the grid input terminal 32 of a pair of electronic amplifier tubes 31 and 33. The third or signal reference terminal 34 is grounded. Two variable inductors 36 and 37 are connected in series between the high signal potential input and output terminals 28 and 29, with a direct current blocking capacitor 38 positioned at their common signal connection point 39 to isolate the anode potential of one tube from the grid circuit of the other. For signal frequencies the capacitor 38 is a short circuit and may essentially be neglected in the ensuing discussion of the coupling circuit operation.

From the common inductor signal connection point 39 a pair of rejector legs 40 and 42 is provided, each being tuned to individual frequencies near each side of the picture passband characteristic of the amplifier. In television video circuits, these rejector legs are preferably tuned to series resonance at the picture channel complemental sound carrier frequency and the adjacent channel sound carrier frequency respectively. Not only do the rejector legs determine the sharp cut-off characteristic upon each side of the picture pass-band, and provide very high attenuation of the sound signals but they form the center leg of an m-derived T-section filter affording the proper flat top shape of the bandpass curve with a corresponding high signal gain.

In the first intermediate frequency amplifier stage 16 the rejector leg 42, tuned to the complemental sound carrier frequency has a tap 44 on the inductor for providing an input signal by the way of lead 22 to the sound intermediate amplifier channel 24. The tap 44 is made at a position where the input loading of the sound intermediate frequency channel will not appreciably effect the high "Q" sound rejection leg 42. Additional sound gain may be provided at the expense of rejection by tapping the inductor at a higher signal potential position. However, it is to be recognized that the sound signal potential available is directly proportional to the "Q" of the rejector circuit, and will have a voltage gain dependent upon a function of the "Q," so that the higher "Q" provided by tapping down on the rejector leg inductor will in general provide both an effective sound gain, and excellent sound rejection in the picture intermediate frequency amplifier channel.

In the picture channel, automatic gain control (AGC) voltage is applied to the first and second stages 16 and 17. The first amplifier 16 has a bypassed cathode resistor 46 to provide high gain characteristics. The second picture stage 17, however, has an unbypassed cathode resistor 47 so that neutralization may be effected for any input capacity shift due to the AGC bias voltage. The last picture stage 18 again has a bypassed cathode resistor 46′ which provides high gain in this stage. Because of the low input capacity of the diode video detector 48 more gain can be obtained from the final I.-F. stage 18, and the detector is operated at a more linear portion of its characteristic curve, than generally possible with other I.-F. amplifier circuits.

A typical m-derived T-section interstage coupling circuit for highly selective flat-top passband operation is shown in Figure 2. In this circuit a small capacitor 50 is added between the plate and cathode of the first amplifier tube 31 to equalize the input and output capacitances of the filter. This capacitor is used to improve the rejection and bandwidth characteristic, while maintaining a flat output response curve. If tubes having approximately equal input and output capacitances, such as the 6BH6 type, are used, this capacitor is unnecessary.

A small series resistor 52 is used to properly terminate the filter, for effecting a flat trailing edge of the bandpass curve in connection with the additional resistor 54 connected between the input electrode 55 of the second tube 33 and ground. With this circuit arrangement a rejection of about 30 decibels (db) is accomplished for each of the adjacent narrow band of frequencies in which the high "Q" rejector legs 40 and 42 are tuned.

The anode supply potential in this embodiment is fed from the power supply terminal 56 to the anode 30 by means of a decoupling resistor 57 at the voltage node provided near common signal circuit connection 39 between the inductors 36 and 37. Circuit operation with this anode feeding arrangement is not greatly affected by a change in anode supply voltage. In this connection, in addition, a high direct-current voltage is available because of the low direct current resistance of the inductor 36, and the signal voltage node feed point is preferable so that signal voltage is not lost in the power supply circuit.

Figure 3:
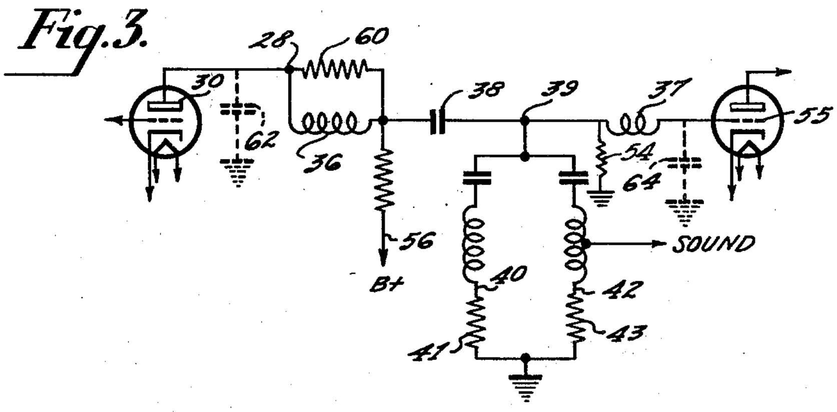

A further m-derived coupling circuit is shown in Figure 3, wherein a peaking resistor 60 is connected in parallel with the inductor 36 nearest the input terminal 28 of the coupling network. This resistor provides a more flat top bandpass response of the filter section at the leading edge of the respons curve. Each of the rejector legs 40 and 42 of this embodiment has a resistor 41 and 43 connected therein to designate the inherent resistance of the inductors. These resistances lower the circuit "Q" and are in general kept as low as possible since they are desirable only if a broader rejection frequency band is required, and the amount of rejection required is not as high. Generally, they may be disregarded since usual rejector circuits provide about a 30 db attenuation. The capacitors 62 and 64 represent input and output stray capacitances and are coupled respectively from the anode 30 and the grid 55 of the respective input and output tubes to ground.

Figure 4:
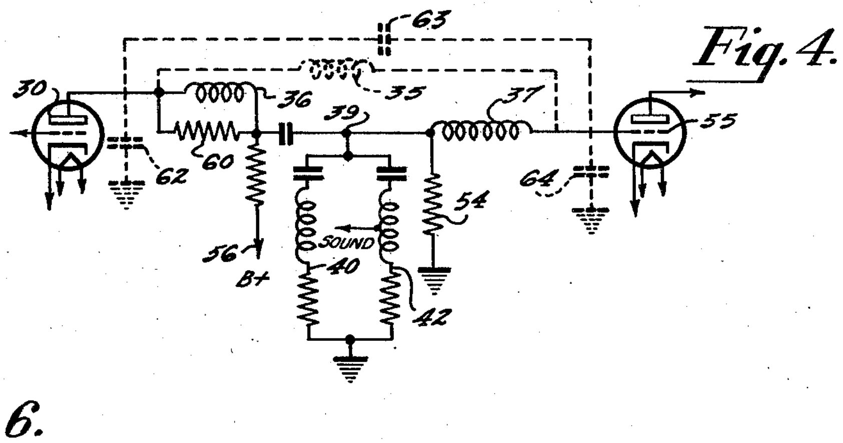

As shown in Figure 4 capacitor 63 represents the stray coupling between the input and output circuits at the anode 30 and the grid 55. Capacitor 63 may also include other circuit capacities and here represents a total stray coupling capacity between the plate 30 and grid 55. This capacity will provide direct coupling of disturbances at the rejection frequencies, and will tend to limit the possible attenuation in the rejector legs 40 and 42.

The capacitor 63 along with capacitors 62 and 64 may be considered on unbalanced $\pi$ (pi) attenuator circuit which provides a large amount of coupling even though the capacitor 63 is small because of the small capacity of the other capacitors 62 and 64. As well known in the art the relationship of coefficient of coupling $k$ is equal to $$\frac{C_{63}}{\sqrt{C_{62}C_{64}}}$$

However, to correct this effect a small amount of mutual coupling may be provided between the inductors 26 and 37 as represented by the inductor 35. This inductor 35 then is selected to have such value as to entirely neutralize the coupling capacitance 63 over the bandpass of the network and thereby improve the attenuation of undesired frequencies in the rejector legs 40 and 42.

Conversely if the capacitance 63 did not exist any coupling between the inductors 36 and 37 would limit the possible attenuation of undesired frequencies or provide undesirable filter characteristics. In general, for obtaining proper bandpass characteristics in the coupling circuits described, other than for the cancellation of stray capacities, no mutual coupling is desirable between inductor arms 36 and 37. The sole coupling is provided by the T-section rejector legs which provides an impedance commonly coupled to both the input and output terminals of the filter network.

The grid leak resistor 54 is connected at terminal 39 to provide for decreasing grid circuit noise impulse response. Because of the resonant nature of the two rejector legs from terminal 39 to ground causing a high impedance at the center of the pass-band frequency and a high reactive component near the center of the passband, an impedance step-up will result with the coil section 37 as one component. Accordingly the resistor 54 is tapped down on the input circuit and therefore may be such smaller than it could be if connected directly from the grid 55 to ground without loading the coupling circuit. This accordingly provides a much shorter R-C time constant in the grid circuit so that noise pulses are more quickly dissipated and noise interference is greatly reduced.

Figure 5:
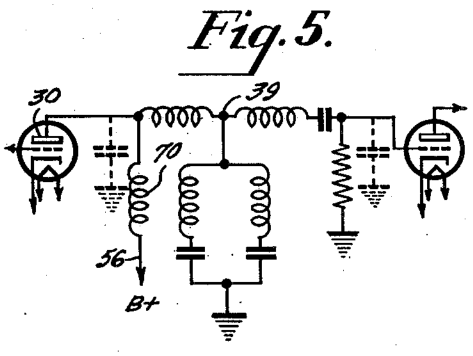

Figure 5 indicates a shunt fed m-derived coupling circuit of the type described wherein choke coil 70 is provided connecting the B+ anode supply terminal 56 to the anode 30. Such a circuit is preferred for affording higher plate voltage to the first amplifier tube but may not provide as good adjacent channel rejection on the upper frequency side because of the shunting effect of stray wiring capacity inherent in the choke.

Figure 6:
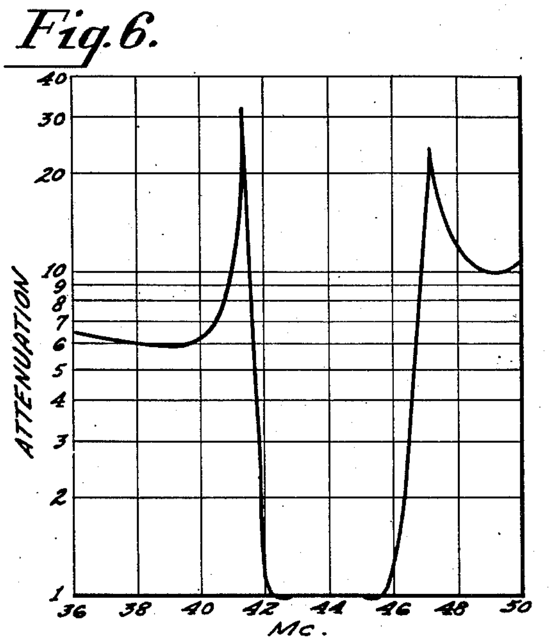

A typical bandpass response characteristic of the above described series m-derived circuit is shown in Figure 6. The overall gain provided by such a circuit with 6CB6 type amplifier tubes at a 45 megacycle picture carrier frequency is about 11 where the series capacitors of each rejection leg are 8.2 micro-microfarads.

The combined coupling circuit and image rejection filter of the invention, as compared with a single sided double tuned circuit, which has the highest gain versus bandwidth factor, afforded approximately 75 per cent of the gain with about 35 times better adjacent channel sound rejection. The improved gain characteristics of this circuit are attributed to the lighter loading of the coupling circuit required in order to obtain the desired bandpass characteristic. The coupling and decoupling means, comprising the two tuned rejector legs, has low impedance so that stray capacity to ground from the common inductor connection point 39 becomes unimportant as the limiting factor in obtaining uniform performance. In addition, with this type of circuit, very little additional shunting capacity need be added to the tuned circuit by the coupling means, thus keeping the L/C ratio higher so that a greater gain may be realized.

The tuning interaction of the circuit is small. In a typical alignment procedure when the transformer is properly loaded, the trap circuits are adjusted for minimum gain or maximum rejection. The series inductors 36 and 37 are then simultaneously adjusted for maximum gain and proper bandpass shape. A single alignment will satisfy all of these conditions and the circuit will provide a flat top response characteristic wide enough for high fidelity operation of the video circuit of a television receiver.

Therefore the invention provides an improved bandpass amplifier comprising a combined coupling and image rejection circuit having a pair of rejector arms tuned to reject frequencies outside of but close to the passband of the amplifier on either side, thereby increasing the selectivity of the amplifier while providing increased gain and maximum circuit stability. The amplifier is particularly adapted for intermediate frequency operation in the vicinity of 40 megacycles.

What is claimed is:

An inter-stage coupling circuit for a television receiver intermediate-frequency amplifier system, said coupling circuit having an input terminal connected to the anode output terminal of a first electron tube amplifier and an output terminal connected to the grid input terminal of a second electron tube amplifier, a signal reference terminal, a first inductor having one end connected to said anode output terminal, a second inductor having one end connected to said grid input terminal, a direct current blocking capacitor connected between the ends of said first and second inductors remote from said first mentioned ends, such that the location of said capacitor constitutes a signal connection point, a pair of series-resonant circuits connected from said one signal connection point to the signal reference terminal of said coupling circuit therewith to provide a T filter section having a picture signal passband characteristic, said series-resonant circuits being tuned to individual frequencies near each side of the picture passband characteristic of said amplifier system, thereby providing rejection of adjacent signal frequencies, an anode power supply terminal, a decoupling resistor connecting said power supply terminal to that end of said first named inductor connected to said blocking capacitor, and a grid leak resistor connected directly from that end of said second named inductor connected to said capacitor to ground, said grid leak resistor being of smaller value than that required for a grid leak resistor connected directly to said grid input terminal.

References Cited in the file of this patent

UNITED STATES PATENTS

| | | |
|---|---|---|
| 1,644,004 | Zobel | Oct. 4, 1927 |
| 1,708,944 | Heising | Apr. 16, 1929 |
| 2,164,745 | Kentner | July 4, 1939 |
| 2,167,079 | Landon | July 25, 1939 |
| 2,196,266 | Landon et al. | Apr. 9, 1940 |
| 2,207,796 | Grundmann | July 16, 1940 |
| 2,272,385 | Salzberg | Feb. 10, 1942 |
| 2,312,145 | Bradley | Feb. 23, 1943 |
| 2,458,365 | Flyer | Jan. 4, 1949 |
| 2,581,159 | Achenbach | Jan. 1, 1952 |